United States Patent
Davis

(10) Patent No.: US 8,094,006 B2
(45) Date of Patent: Jan. 10, 2012

(54) PORTABLE BEARING TEST DEVICE

(75) Inventor: Randall Dean Davis, Claremore, OK (US)

(73) Assignee: Honeywell International Inc., Morristown, NJ (US)

(*) Notice: Subject to any disclaimer, the term of this patent is extended or adjusted under 35 U.S.C. 154(b) by 586 days.

(21) Appl. No.: 12/342,437

(22) Filed: Dec. 23, 2008

(65) Prior Publication Data

US 2010/0156652 A1 Jun. 24, 2010

(51) Int. Cl.
*G08B 29/00* (2006.01)

(52) U.S. Cl. ........ 340/514; 340/506; 340/679; 340/682; 340/687; 340/686.2; 340/686.3; 340/650; 340/651; 322/44; 361/31

(58) Field of Classification Search .................. 340/514, 340/506, 679, 680, 682, 686.1, 687, 686.2, 340/686.3, 650, 651; 322/44; 361/31
See application file for complete search history.

(56) References Cited

U.S. PATENT DOCUMENTS

| 1,001,152 | A |  | 8/1911 | Lawrence |  |
|---|---|---|---|---|---|
| 3,102,759 | A | * | 9/1963 | Stewart | 384/276 |
| 3,176,286 | A |  | 3/1965 | Dschen |  |
| 3,508,241 | A |  | 4/1970 | Potter |  |
| 3,777,195 | A |  | 12/1973 | Potter |  |
| 3,861,818 | A | * | 1/1975 | Eggenberger | 415/14 |
| 5,602,437 | A |  | 2/1997 | Shahamat et al. |  |
| 7,119,520 | B2 | * | 10/2006 | Wingett et al. | 322/44 |
| 2005/0206351 | A1 | * | 9/2005 | Wingett et al. | 322/44 |
| 2008/0184083 | A1 | * | 7/2008 | Isom et al. | 714/726 |

* cited by examiner

*Primary Examiner* — Daryl Pope
(74) *Attorney, Agent, or Firm* — Ingrassia Fisher & Lorenz, P.C.

(57) ABSTRACT

A portable bearing test device includes a power supply that is operable to supply direct current (DC) electrical power via a plurality of power supply outputs and a circuit common. Independent bearing test circuits are coupled to receive output electrical power from one of the power supply outputs, and are further adapted to independently couple to a separate rotating machine test bearing. Separate indicator lights are electrically coupled in series in each of the independent bearing test circuits.

13 Claims, 3 Drawing Sheets

PORTABLE BEARING TEST DEVICE

TECHNICAL FIELD

The present invention generally relates to a test device and, more particularly, to a portable test device for simultaneously testing multiple bearings in a rotating machine.

BACKGROUND

Rotating machines, such as turbine-driven generators, include bearing systems to rotationally mount the rotating parts of the machine (e.g., the rotor shaft, etc.). Over time, the bearing systems within rotating machines are subject to wear. If the bearing systems are allowed to wear too much, it can result in inoperability of the rotating machine. Depending upon the end-use of the rotating machine, its inoperability can have rather significant results.

In light of the foregoing, some rotating machines, such as turbine-driven generators installed in aircraft, include sensing systems that are configured to detect the onset of failure of the generator bearing systems. These sensing systems typically include a secondary bearing system that is isolated from electrical common during normal machine operation, when the normal (or primary) bearings are operating properly. The secondary bearing system typically includes a secondary bearing associated with each of the primary bearings. The sensing system also includes an enunciator (e.g., indicator) that, via suitable wiring, is electrically coupled in series between a power source and each of the secondary bearings. After sufficient wear of its associated primary bearing, a secondary bearing will contact circuit common, and thereby act as a switch, to electrically energize the enunciator and provide a visual warning to personnel.

Although the above-described bearing sensing systems operate generally well, these systems do suffer certain drawbacks. For example, when the enunciator is energized, personnel are unable to distinguish which of the primary bearings is worn. Present systems provide no means of determining if the enunciator has failed (e.g., burned out). Moreover, false enunciation can occur if the sensing system wiring becomes grounded. This can lead to unneeded removal from the generator prime mover and disassembly of the rotating machine.

Accordingly, it is desirable to provide a system and method of testing rotating machine bearings that allows personnel to determine which bearing is worn, and/or detects a failed enunciator, and/or is less immune to wiring grounds than present systems. The present invention addresses one or more of these needs.

BRIEF SUMMARY

In one embodiment, and by way of example only, a portable bearing test device includes a housing, a power supply, a plurality of independent bearing test circuits, a plurality of indicator lights, and a test switch. The power supply is disposed within the housing, is adapted to selectively receive alternating current (AC) electrical power, and is operable to supply direct current (DC) electrical power via a plurality of power supply outputs and a circuit common. Each independent bearing test circuit is coupled to receive output electrical power from one of the power supply outputs, and is further adapted to independently couple to a separate rotating machine test bearing. Each indicator light is mounted on the housing and is electrically coupled in series in one of the independent bearing test circuits. The test switch is mounted on the housing and has an input and an output. The test switch input is electrically coupled to each of the independent bearing test circuits, and the test switch output is electrically coupled to the circuit common. The test switch is movable between a normally-open position, in which the test switch does not electrically couple each of the independent bearing test circuits to circuit common, and a momentary-contact closed position, in which the test switch electrically couples each of the independent bearing test circuits to circuit common.

In another exemplary embodiment, a rotating machine bearing test system includes a rotating machine and a portable bearing test device. The rotating machine includes first and second primary bearings and first and second secondary bearings. The first and second secondary bearing are each isolated from electrical common until the first or second primary bearing, respectively, wears a predetermined amount, whereupon the first or second secondary bearing, respectively, is electrically coupled to electrical common. The portable bearing test device is electrically coupled to an input power source, the first secondary bearing, and the second secondary bearing, and includes a housing, a power supply, first and second independent bearing test circuits, first and second indicator lights, and a test switch. The power supply is disposed within the housing, is coupled to selectively receive alternating current (AC) electrical power from the input power source, and is operable to supply direct current (DC) electrical power via first and second power supply outputs and electrical common. The first independent bearing test circuit is electrically coupled in series with the first power supply output and the first secondary bearing. The second independent bearing test circuit is electrically coupled in series with the second power supply output and the second secondary bearing. The first and second indicator lights are mounted on the housing, the first indicator light is electrically coupled in series in the first independent bearing test circuit, and the second indicator light is electrically coupled in series in the second independent bearing test circuit. The test switch is mounted on the housing and has an input and an output. The test switch input is electrically coupled to the first and second independent bearing test circuits, and the test switch output is electrically coupled to the electrical common. The test switch is movable between a normally-open position, in which the test switch does not electrically couple the first and second independent bearing test circuits to circuit common, and a momentary-contact closed position, in which the test switch electrically couples the first and second independent bearing test circuits to circuit common.

In yet another exemplary embodiment, a method of independently testing a plurality of primary bearings in a rotating machine that includes a secondary bearing associated with each primary bearing, wherein each secondary bearing includes an output lead and is electrically isolated from electrical common until its associated primary bearing wears a predetermined amount, whereupon the associated secondary bearing electrically couple its output lead to electrical common, includes electrically disconnecting the secondary bearing output leads from external wiring. An independent bearing test circuit, which includes an electrically series coupled indicator, is electrically connected to each of the secondary bearing output leads. DC electrical power is applied to each of the independent bearing test circuits.

Furthermore, other desirable features and characteristics of the bearing test device and method will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description. In this regard, although the test device disclosed herein is described as being used with a particular type of rotating machine, namely a turbine-driven generator, it will be appreciated that this is merely illustrative of any one of numerous rotating machines with which the test device may be used.

Figure 1:
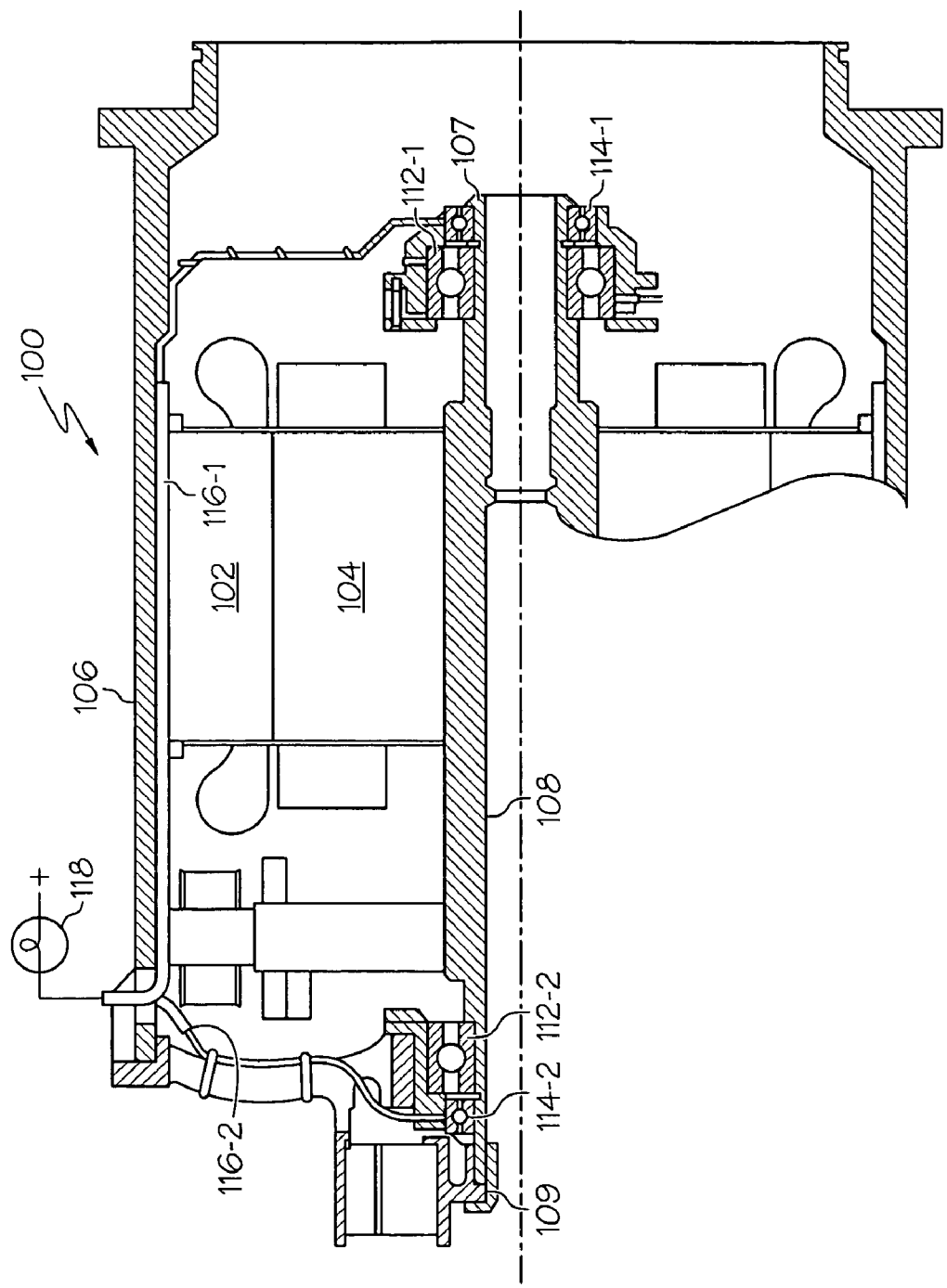
FIG. 1 is a cross section view of a portion of an exemplary rotating machine.

Turning now to FIG. 1, a cross section view of a portion of an electrical generator 100 is depicted, and includes a main stator 102 and a main rotor 104. The main stator 102 is fixedly disposed within a generator housing 106 and surrounds the main rotor 104. The main rotor 104 is also disposed within the generator housing 106, and is mounted on a rotationally mounted rotor shaft 108. The rotor shaft 108 includes a first end 107 and a second end 109, and is rotationally mounted within the generator housing 106 via a plurality of primary bearing assemblies 112. In the depicted embodiment, the rotor shaft 108 is rotationally mounted via two primary bearing assemblies 112, a first primary bearing assembly 112-1 and a second primary bearing assembly 112-2. It will be appreciated, however, that this is merely exemplary and that it, and other rotating machines, may include more than this number of primary bearing assemblies 112 (e.g., 112-1, 112-2, 112-3, . . . 112-N).

No matter the particular number of primary bearing assemblies 112, the electrical generator 100 depicted in FIG. 1 is configured to be driven by another, non-illustrated external machine, such as a gas turbine engine or other prime mover. In the depicted embodiment, the external machine is coupled to, and supplies a drive torque to, the rotor shaft first end 107. As such, the rotor shaft first end 107 may be referred to as the drive end (DE), and the rotor shaft second end 109 may be referred to as the anti-drive end (ADE). Similarly, the first and second primary bearing assemblies 112-1, 112-1 may be referred to as the DE primary bearing assembly 112-1 and the ADE primary bearing assembly 112-2, respectively.

Before proceeding further, it is noted that the depicted electrical generator 100 includes various other components that are not needed to fully describe and enable the present invention. As such, these other components will not be described. For example, the depicted electrical generator 100 is equipped with a permanent magnet generator (PMG) and with numerous and varied structural and mounting features that need not be described to fully describe or enable the present invention.

Returning once again to FIG. 1, it is seen that the electrical generator 100 additionally includes a plurality of secondary bearing assemblies 114. Preferably, the electrical generator 100 includes a secondary bearing assembly 114 associated with each primary bearing assembly 112. Thus, in the depicted embodiment, the electrical generator includes a first secondary bearing assembly 114-1 and a second secondary bearing assembly 114-2. The first and second secondary bearings 114-1, 114-2 are each electrically coupled, via suitable output leads 116 (e.g., 116-1, 116-2), to an enunciator 118. The enunciator 118 is in turn coupled to a suitable, non-illustrated power source. The first and second secondary bearings 114-1, 114-2 are mounted within the generator housing 106 such that each is isolated from electrical common until its associated primary bearing assembly 112 wears a predetermined amount. If the first or second primary bearing assembly 112-1, 112-2 wears the predetermined amount, then the first or second secondary bearing assembly 114-1, 114-2, respectively, is electrically coupled to electrical common. When this occurs, a circuit is completed through the enunciator 118, providing an indication that one of the primary bearing assemblies 112 has worn to the point of the onset of failure, or has failed altogether.

Figure 2:
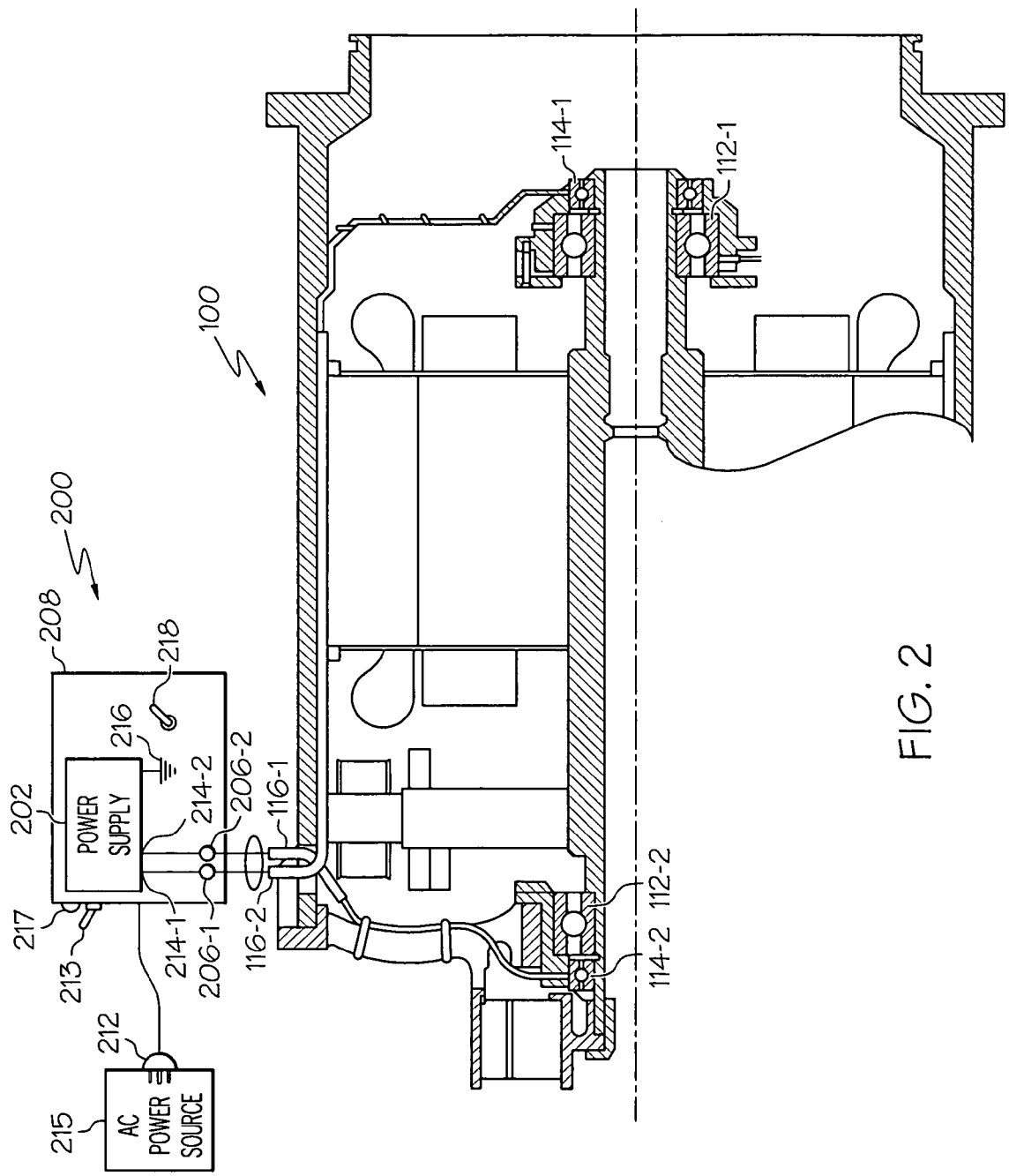
FIG. 2 depicts an exemplary test device connected to the exemplary rotating machine of FIG. 1.

As noted above, when the enunciator 118 is energized, although personnel now aware of a problem (or potential problem) with a primary bearing assembly 112, they are unable to distinguish which of the primary bearings 112 is suspect. Moreover, if any portion of the output leads 116 (or other associated wiring) becomes grounded, the enunciator 118 will be energized, providing a false indication of primary bearing wear. Both of these situations can lead to unneeded and undesired removal from the prime mover and disassembly of the electrical generator. Thus, as depicted in FIG. 2, when the in-situ enunciator 118 indicates a potential primary bearing wear issue, before the electrical generator 100 is removed and disassembled, a portable bearing test device 200 is connected to the electrical generator 100.

Figure 3:
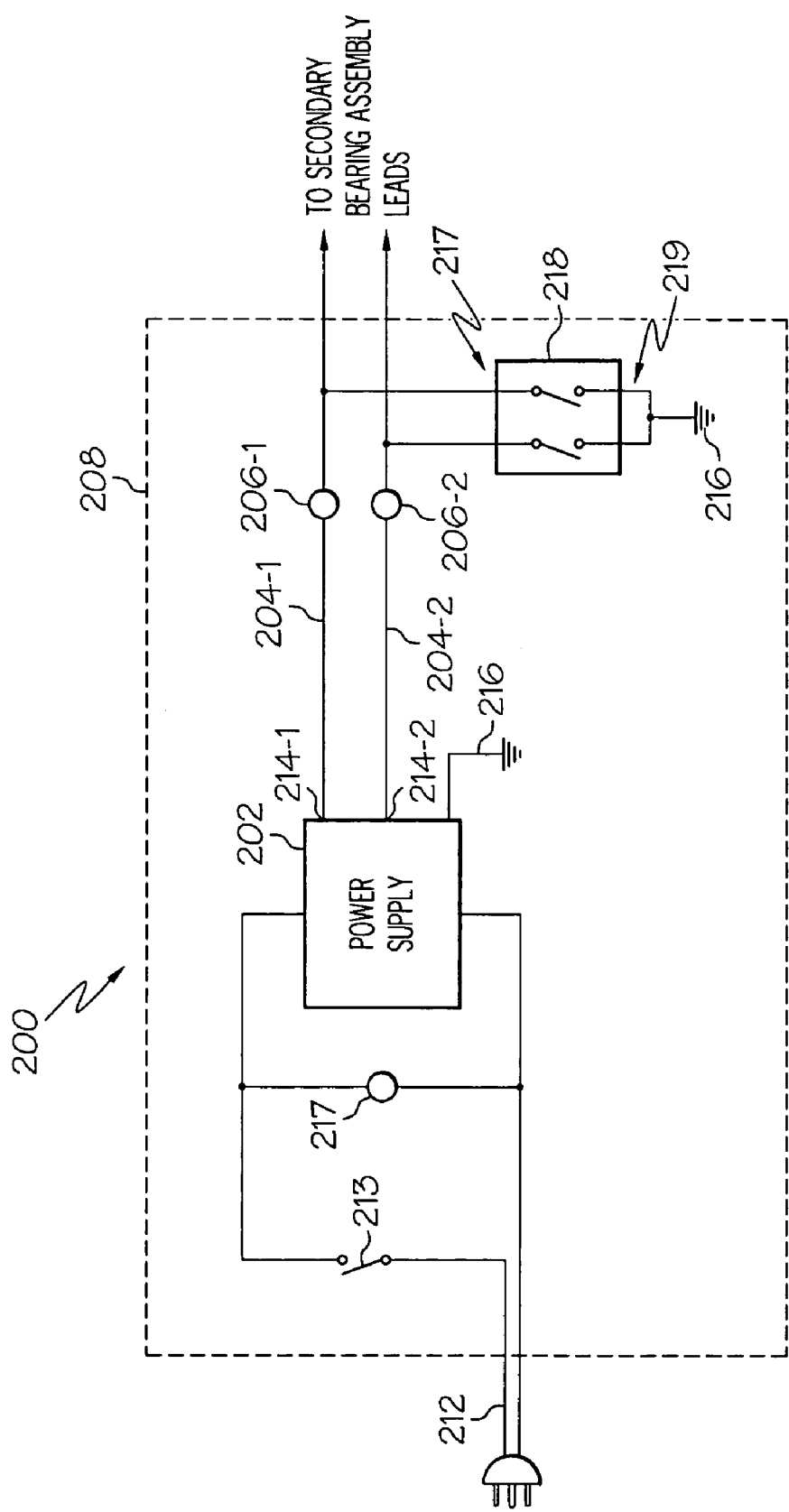
FIG. 3 depicts a schematic representation of the exemplary test device depicted in FIG. 2.

The portable test device 200, an embodiment of which is schematically depicted in FIG. 3, includes a power supply 202, a plurality of independent bearing test circuits 204 (e.g., 204-1, 204-2), and a plurality of indicator lights 206 (e.g., 206-1, 206-2). The power supply 202 is disposed within a device housing 208, and is adapted to be selectively coupled to an alternating current (AC) electrical power source. In the depicted embodiment, the power supply 202 is configured to be selectively coupled to a 120 VAC power source via, for example, a conventional two-prong or three-prong (preferable) outlet plug 212 and a power switch 213. When the outlet plug 212 is connected to a suitable AC power source 215 (see FIG. 2) and the power switch 213 is closed, an optional power indicator 217 is illuminated and the AC power is supplied to the power supply 202. The power supply 202 is configured, upon receipt of AC electrical power, to supply direct current (DC) electrical power via a plurality of power supply outputs 214 (e.g., 214-1, 214-2) and a circuit common 216. It will be appreciated that the power supply 202 may be implemented using any one of numerous suitable power supplies for implementing this functionality.

The independent bearing test circuits 204 are coupled to receive DC electrical power from one of the power supply outputs 214. As FIG. 2 also depicts, the independent bearing test circuits 204 are independently electrically coupled to separate ones of the secondary bearing assemblies 114. That is, a first independent test circuit 204-1 is electrically coupled to the first secondary bearing assembly 114-1, and a second independent test circuit 204-2 is electrically coupled to the second secondary bearing assembly 204-2. It will be appreciated that the test device 200 could be implemented with more than two independent test circuits 204.

The indicator lights 206 are mounted on the device housing 208, and each is electrically coupled in series in one of the independent bearing test circuits 204. In particular, a first indicator light 206-1 is coupled in series in the first independent test circuit 204-1, and a second indicator light 206-2 is coupled in series in the second independent test circuit 204-2. It may thus be appreciated that whenever one of the independent test circuits 204 is electrically coupled to circuit common 216, its associated indicator light 206 will be illuminated. Hence, as will be described in more detail further below, when the test device 200 is connected to the electrical generator 100 as depicted in FIG. 2, the test device 200 will indicate which, if either, of the primary bearing assemblies 112 is worn. It will be appreciated that the indicator lights 206 may be the same color or different colors, but in a preferred embodiment the indicator lights 206 are different color lights. It will additionally be appreciated that if the test device 200 includes more than two independent test circuits 204, it will additionally include more than two indicator lights 206 (e.g., it will include one indicator light 206 per test circuit 204).

As FIGS. 2 and 3 also depict, the test device 200 preferably includes a test switch 218. The test switch 218 is preferably mounted on the device housing 208 and includes an input 217 and an output 219. The test switch input 217 is electrically coupled to each of the independent bearing test circuits 204, and the test switch output 219 is electrically coupled to the circuit common 216. The test switch 218 is movable between an open position and a closed position. In the open position, which is the position depicted in FIG. 3, the test switch 218 does not electrically couple each of the independent bearing test circuits 204 to circuit common 216. Conversely, in the closed position the test switch 218 electrically couples each of the independent bearing test circuits 204 to circuit common 216. Thus, when the test switch 218 is in the closed position, if the indicators 206 are operating properly (e.g., not burned out), then both will illuminate. If an indicator 206 does not illuminate, then this indicates that it (or its associated wiring) is faulty. Preferably, though not necessarily, the test switch 218 is implemented using a momentary switch that is biased toward its open position.

The preferable manner in which the test device 200 is connected to the electrical generator 100 and operated will now be described. Initially, the output leads 116 that are connected to the secondary bearings 114 are disconnected from any external wiring. Thereafter, the independent bearing test circuits 204 are independently electrically connected to each of the secondary bearing assembly output leads 116. The test device 200 is then connected to an appropriate power source 215 and the power switch 213 is closed. With these connections made, DC electrical power is supplied to each of the independent bearing test circuits 204. Hence, the indicator 206 that is electrically connected to the secondary bearing assembly 114 associated with the suspect primary bearing 112 will illuminate.

It is noted that the test device 200 will also indicate whether the in-situ enunciator 118 was energized because a portion of its associated wiring became grounded. This is because, as was just noted, the output leads 116 that are connected to the secondary bearings 114 are disconnected from any external wiring, and the independent bearing test circuits 204 are independently electrically connected to each of the output leads 116. Thus, when the test device 200 is connected to an appropriate power source 215 and the power switch 213 is closed, if neither indicator 206 illuminates after being verified as operational, then this indicates a likely ground in the external wiring.

Although the test device 200 is depicted as being connected to only a single electrical generator 100 and to two secondary bearing assemblies 114, it will be appreciated that it could be configured to connect to multiple generators 100 (or other rotating machines) and/or to more than two secondary bearing assemblies 114.

The test device described herein provides a method for personnel to test rotating machine bearings to determine which bearing is worn, to detects a failed enunciator, and/or to determine whether wiring grounds are present in in-situ systems.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A portable bearing test device, comprising:
   a housing;
   a power supply disposed within the housing, the power supply adapted to selectively receive alternating current (AC) electrical power and operable to supply direct current (DC) electrical power via a plurality of power supply outputs and a circuit common;
   a plurality of independent bearing test circuits, each bearing test circuit coupled to receive output electrical power from one of the power supply outputs, each bearing test circuit further adapted to independently couple to a separate rotating machine test bearing;
   a plurality of indicator lights mounted on the housing, each indicator light electrically coupled in series in one of the independent bearing test circuits; and
   a test switch mounted on the housing and having an input and an output, the test switch input electrically coupled to each of the independent bearing test circuits, the test switch output electrically coupled to the circuit common, the test switch movable between an open position, in which the test switch does not electrically couple each of the independent bearing test circuits to circuit common, and a closed position, in which the test switch electrically couples each of the independent bearing test circuits to circuit common.

2. The device of claim 1, further comprising:
   a power supply indicator coupled to receive the AC electrical power when the power supply receives the AC electrical power.

3. The device of claim 1, further comprising:
   an input switch adapted to receive the AC electrical power and movable between a closed position, in which the AC electrical power is supplied to the power supply, and an open position, in which the AC electrical power is not supplied to the power supply.

4. The device of claim 1, wherein the test switch is a momentary switch that is biased toward the open position.

5. The device of claim 1, wherein the plurality of independent bearing test circuits comprise a drive-end bearing test circuit and an anti-drive end bearing test circuit.

6. A rotating machine bearing test system, comprising:
   a rotating machine including first and second primary bearings and first and second secondary bearings, the first and second secondary bearing each isolated from electrical common until the first or second primary bearing, respectively, wear a predetermined amount, whereupon the first or second secondary bearing, respectively, is electrically coupled to electrical common; and a portable bearing test device electrically coupled to (i) an input power source, (ii) the first secondary bearing, and (iii) the second secondary bearing, the portable bearing test device comprising:
  a housing,
  a power supply disposed within the housing, the power supply coupled to selectively receive alternating current (AC) electrical power from the input power source and operable to supply direct current (DC) electrical power via first and second power supply outputs and electrical common,
  first and second independent bearing test circuits, the first independent bearing test circuit electrically coupled in series with the first power supply output and the first secondary bearing, the second independent bearing test circuit electrically coupled in series with the second power supply output and the second secondary bearing,
  first and second indicator lights mounted on the housing, the first indicator light electrically coupled in series in the first independent bearing test circuit, the second indicator light electrically coupled in series in the second independent bearing test circuit, and
  a test switch mounted on the housing and having an input and an output, the test switch input electrically coupled to the first and second independent bearing test circuits, the test switch output electrically coupled to the electrical common, the test switch movable between an open position, in which the test switch does not electrically couple the first and second independent bearing test circuits to circuit common, and a closed position, in which the test switch electrically couples the first and second independent bearing test circuits to circuit common.

7. The system of claim 6, further comprising:
a power supply indicator coupled to receive the AC electrical power when the power supply receives the AC electrical power.

8. The system of claim 6, further comprising:
an input switch coupled to receive the AC electrical power and movable between a closed position, in which the AC electrical power is supplied to the power supply, and an open position, in which the AC electrical power is not supplied to the power supply.

9. The system of claim 6, wherein the test switch is a momentary switch that is biased toward the open position.

10. The system of claim 6, wherein:
the rotating machine comprises a generator; and
the first primary bearing and the second primary bearing comprise a drive-end bearing and an anti-drive end bearing, respectively.

11. A method of independently testing a plurality of primary bearings in a rotating machine that includes a secondary bearing associated with each primary bearing, wherein each secondary bearing includes an output lead and is electrically isolated from electrical common until its associated primary bearing wears a predetermined amount, whereupon the associated secondary bearing electrically couple its output lead to electrical common, the method comprising the steps of:
  electrically disconnecting the secondary bearing output leads from external wiring;
  electrically connecting an independent bearing test circuit to each of the secondary bearing output leads, each independent bearing test circuit including an electrically series coupled indicator; and
  applying DC electrical power to each of the independent bearing test circuits.

12. The method of claim 11, further comprising:
momentarily electrically connecting each of the independent bearing test circuits to electrical common to momentarily supply current through each of the indicators.

13. The method of claim 11, further comprising:
removing the rotating machine from service for repair if any of the indicators illuminates when DC power is supplied to each of the independent bearing test circuits.

* * * * *